United States Patent [19]
Friend

[11] 3,884,669
[45] May 20, 1975

[54] REFRACTORY ELEMENTS

[75] Inventor: Harry Frederick Friend, Saint Helens, England

[73] Assignee: Pilkington Brothers Limited, Liverpool, England

[22] Filed: Sept. 19, 1974

[21] Appl. No.: 507,505

Related U.S. Application Data

[63] Continuation of Ser. No. 301,407, Oct. 27, 1972, abandoned.

[30] Foreign Application Priority Data
Nov. 3, 1971  United Kingdom............... 51173/71

[52] U.S. Cl............................. 65/343; 65/374 RM
[51] Int. Cl............................................. C03b 5/20
[58] Field of Search..................... 65/134, 340–344, 65/374 RM

[56] References Cited
UNITED STATES PATENTS

| | | |
|---|---|---|
| 1,609,266 | 11/1926 | Metzgat............................... 65/344 |
| 1,614,114 | 1/1927 | Fowle .................................. 65/343 |
| 1,828,843 | 10/1931 | Mambourg............................ 65/343 |
| 2,950,572 | 8/1960 | Perraut................................. 65/344 |
| 3,226,220 | 12/1965 | Plumat.................................. 65/342 |
| 3,397,976 | 8/1968 | Hynd .................................... 65/344 |
| 3,628,936 | 12/1971 | Plumat et al.......................... 65/344 |
| 3,656,924 | 4/1972 | Chapman et al................. 65/134 X |
| 3,723,084 | 3/1973 | Colchagoff........................... 65/136 |

Primary Examiner—Robert L. Lindsay, Jr.
Attorney, Agent, or Firm—Sughrue, Rothwell, Mion, Zinn and Macpeak

[57] ABSTRACT

A refractory element, for example a floater or skim bar, for use in a glass melting furnace comprises a body of refractory material sheathed in a refractory metal skin with means on the top of the element for retaining a static pool of molten glass to minimize metal vaporization from the exposed surface of the skin.

5 Claims, 2 Drawing Figures

REFRACTORY ELEMENTS

This is a continuation of application Ser. No. 301,407 filed Oct. 27, 1972, now abandoned.

BACKGROUND OF THE INVENTION

1. Field of the Invention

This invention relates to glass making apparatus and more particularly to refractory elements for use in glass making apparatus, which elements comprise a body of refractory material at least partially encased with a refractory metal which is resistant to attack by molten glass.

2. Description of the Prior Art

U.S. Pat. No. 3,397,976 describes a refractory element construction which is especially suitable for refractory elements which are to be submerged in molten glass, or supported on the surface of molten glass, and claims a refractory element comprising a body of refractory material encased with a skin of a metal which is resistant to molten glass, the refractory body being so formed that the element is buoyant in the molten glass in which, in use, the element is located.

Metals which are resistant to molten glass, nevertheless may form an oxide which tends to volatilize in the atmosphere above molten glass in glass making apparatus. The metal skin may be platinum or a platinum based alloy, and where the metal skin is exposed to the atmosphere above the molten glass, for example when the refractory element is a floater or skim bar in a glass melting furnace, platinum oxide may be formed, which tends to volatilize and be swept away by high velocity gas currents above the glass.

An object of this invention is to minimize the loss of metal used to encase a refractory element.

SUMMARY

A refractory element according to the invention for use in glass making apparatus comprises a body of refractory material which is at least partially encased with a skin of refractory metal which is resistant to attack by molten glass. On an upwardly facing surface of the skin there is means for retaining a static pool of molten glass on that surface. The refractory metal is usually platinum or a platinum alloy.

DESCRIPTION OF THE PREFERRED EMBODIMENT

Figure 1:
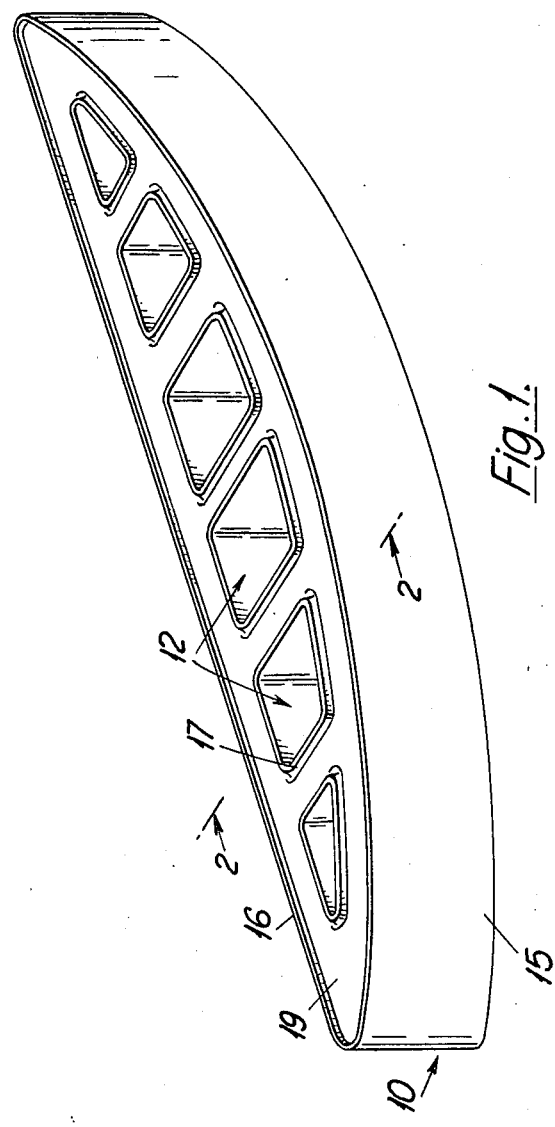
FIG. 1 is a perspective view of a refractory floater according to the invention for use as a floater in a glass melting furnace.

In glass making apparatus, in particular apparatus for the manufacture of flat glass, there are some refractory elements, e.g., floaters and draw-bars, which are either submerged in, or are supported on the surface of molten glass. In order to prevent the molten glass from being contaminated by the refractory material from which the elements are made, the refractory elements are sometimes sheathed in platinum or a platinum alloy which is resistant to attack by molten glass.

The present invention concerns refractory elements which are to be supported at the surface of the molten glass, for example floaters or skim bars which are employed in glass melting furnaces to hold back on the glass surface impurities which would otherwise flow out of the glass melting tank with the molten glass to a forming process. Floaters are usually designed so that they have an effective specific gravity of the same order as molten glass and are buoyant in the molten glass.

Referring to the drawings, a floater 10 for use in a glass melting furnace comprises a refractory body 11 formed for example of alumina or fused silica refractory. Vertical passages 12 pass upwardly through the body 10 to allow the body to float on the surface of molten glass. The glass level 14 relative to the floater 10 is shown in FIG. 2.

The refractory body 11 is encased with a skin 15 of a refractory metal which is resistant to attack by molten glass, which skin includes integral linings for the walls of the passages 12. The refractory metal is preferably platinum or a platinum alloy, e.g., an alloy of platinum with rhodium or iridium, and the skin thickness is of the order of 1 mm or less.

The metal skin 15 is extended upwardly to provide an external peripheral lip 16 around the upper surface of the floater 10 and the linings of the passages 12 also extend upwardly to form internal peripheral lips 17 around the upper ends of the passages 12.

Figure 2:
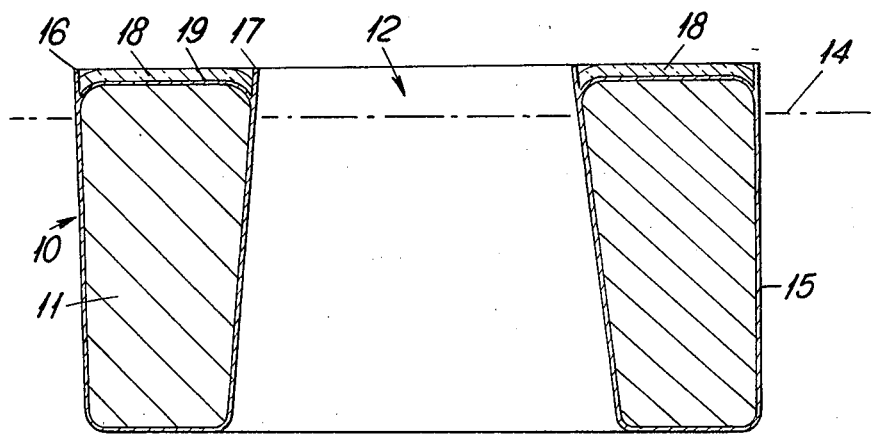
FIG. 2 is an enlarged section along line 2—2 of FIG. 1, the figure showing a thin layer of molten glass retained on the top surface of the floater.

The lips 16, 17 co-operate to provide retaining means for a static pool 18, FIG. 2, of molten glass which is retained on the upper surface 19 of the floater 10 in use. This molten glass layer 18 covers a large proportion of the skin 15 which would otherwise be exposed above the molten glass to the high temperature atmosphere in the glass melting furnace, and thereby reduces detrimental loss of platinum by volatilization as platinum oxide.

The pool 18 of molten glass may be formed by pouring molten glass on to the upper surface 19 of the floater 10 when it is in position, or may be formed from cullet placed on the surface 19, as the floater is being installed.

If desired the lips 16, 17 may be discontinuous, extending in short spaced-apart lengths around the surface 19 and the upper ends of passages 12. In this case, surface tension plays a part in the retaining of the pool 18 of molten glass.

In another embodiment, the upper surface 19 of the floater has a dished generally concave shape in which the molten glass layer is retained without lips.

Instead of using refractory metal lips to retain the molten glass a mesh or gauze of refractory metal may be used on the top surface of the refractory metal skin to retain the molten glass by surface tension. This enables the amount of precious metal used to be reduced. For example, the invention is also applicable to refractory elements forming other parts of the glass making apparatus. As in the case of a floater, each retaining element is provided with means for retaining on at least a part of an upwardly facing surface a static pool of molten glass which thereby protects the precious metal encasing said part of the surface from volatilization.

I claim:

1. In a refractory element for use in glass making apparatus, having a body of refractory material, and a skin of refractory metal encasing said body, which skin includes an upwardly facing portion covering an upwardly facing surface of the refractory body which in use would be exposed above molten glass in the apparatus, the improvement comprising refractory metal lip means integral with said skin and extending upwardly above the upper surface of said upwardly facing portion of the skin and located around the periphery of said upwardly facing portion sufficient to retain a static pool of molten glass on top of said upwardly facing portion of the skin.

2. A refractory element shaped to constitute a floater for use in glass melting apparatus, comprising:
   a. a body of refractory material formed with a plurality of vertical passages open at both ends;
   b. a skin of refractory metal covering the outer surface of said body and the sides of the vertical passages, which skin includes an upwardly facing portion covering an upwardly facing surface of the refractory body which in use would be exposed above molten glass in the apparatus;
   c. a plurality of refractory metal lips, each integral with said skin and extending upwardly above the upper surface of said upwardly facing portion of the skin, one lip located around the periphery of said upwardly facing portion, and the remaining lips located around the periphery of each of the upwardly facing openings of the vertical passages such that the lips cooperate to retain a static pool of molten glass on top of said upwardly facing portion of the skin.

3. A refractory element according to claim 1, wherein said refractory metal is platinum.

4. A refractory element according to claim 1, wherein said refractory metal is a platinum alloy.

5. A refractory element according to claim 1, wherein said refractory body is so formed that the element is buoyant in molten glass.

* * * * *